US012542105B2

(12) United States Patent
Ozgurluk et al.

(10) Patent No.: US 12,542,105 B2
(45) Date of Patent: Feb. 3, 2026

(54) HIGH RESOLUTION DISPLAY CIRCUITRY WITH GLOBAL INITIALIZATION

(71) Applicant: Apple Inc., Cupertino, CA (US)

(72) Inventors: Alper Ozgurluk, Sunnyvale, CA (US); Andrew Lin, San Jose, CA (US); Cheuk Chi Lo, Belmont, CA (US); Chun-Ming Tang, Saratoga, CA (US); Shinya Ono, Santa Clara, CA (US); Chun-Yao Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 100 days.

(21) Appl. No.: 18/358,752

(22) Filed: Jul. 25, 2023

(65) Prior Publication Data

US 2024/0096285 A1 Mar. 21, 2024

Related U.S. Application Data

(60) Provisional application No. 63/408,038, filed on Sep. 19, 2022.

(51) Int. Cl.

*G09G 3/3258* (2016.01)
*G09G 3/3266* (2016.01)
*G09G 3/3291* (2016.01)

(52) U.S. Cl.

CPC ......... *G09G 3/3258* (2013.01); *G09G 3/3266* (2013.01); *G09G 3/3291* (2013.01);

(Continued)

(58) Field of Classification Search

CPC .. G09G 3/3258; G09G 3/3266; G09G 3/3291; G09G 2300/0842;

(Continued)

(56) References Cited

U.S. PATENT DOCUMENTS 8,665,183 B2 3/2014 Liu et al.
8,933,433 B2 1/2015 Higginson et al.

(Continued)

FOREIGN PATENT DOCUMENTS

CN 103440840 A 12/2013
CN 108564922 A * 9/2018 ........... G09G 3/3233

(Continued)

*Primary Examiner* — Patrick N Edouard
*Assistant Examiner* — Joseph P Fox
(74) *Attorney, Agent, or Firm* — Treyz Law Group; Jason Tsai

(57) ABSTRACT

A display may include an array of pixels. A pixel can include an organic light-emitting diode, up to three thin-film transistors, and up to two capacitors. The pixel can include a drive transistor, an emission transistor, and a select transistor. The select transistor can be used to apply a reference voltage to the gate of the drive transistor during a global reset phase and during a global threshold voltage sampling phase and can also be used to apply a data voltage to the gate of the drive transistor during a data programming phase. The drive transistor can receive a power supply voltage that toggles between a low voltage during the global reset phase and a high voltage during other phases of operation. Configured and operated in this way, the pixel need not include separate dedicated anode reset and initialization transistors.

21 Claims, 12 Drawing Sheets

(52) U.S. Cl.
CPC ............... *G09G 2300/0842* (2013.01); *G09G 2320/0233* (2013.01); *G09G 2320/0247* (2013.01)

(58) Field of Classification Search
CPC ... G09G 2320/0233; G09G 2320/0247; G09G 2300/0417; G09G 2300/0819; G09G 2300/0852; G09G 2300/0861; G09G 2300/0866; G09G 3/3233; G09G 2310/0202; G09G 2310/0251; G09G 2310/063; G09G 2320/045
See application file for complete search history.

(56) References Cited

U.S. PATENT DOCUMENTS

| | | | | |
|---|---|---|---|---|
| 10,916,198 | B2 | 2/2021 | Lin et al. | |
| 11,348,530 | B2 | 5/2022 | Choi et al. | |
| 2013/0127932 | A1* | 5/2013 | Han | G09G 3/3233 345/212 |
| 2017/0330514 | A1* | 11/2017 | Yin | G09G 3/3216 |
| 2018/0137818 | A1* | 5/2018 | Kim | G09G 3/2003 |
| 2019/0073957 | A1* | 3/2019 | Yang | G09G 3/3258 |
| 2019/0180688 | A1* | 6/2019 | Yang | G09G 3/3258 |
| 2019/0206334 | A1 | 7/2019 | Lee et al. | |
| 2020/0005711 | A1 | 1/2020 | Yang et al. | |
| 2021/0027702 | A1 | 1/2021 | Park et al. | |
| 2021/0327347 | A1* | 10/2021 | Xu | G09G 3/2092 |
| 2022/0114963 | A1 | 4/2022 | Chaji | |
| 2022/0230584 | A1* | 7/2022 | Ohara | G09G 3/3266 |
| 2022/0293712 | A1 | 9/2022 | Park et al. | |

FOREIGN PATENT DOCUMENTS

| | | | | |
|---|---|---|---|---|
| KR | 100729100 B1 | | 6/2007 | |
| KR | 20210079586 A | * | 6/2021 | G09G 3/32 |

* cited by examiner

HIGH RESOLUTION DISPLAY CIRCUITRY WITH GLOBAL INITIALIZATION

This application claims the benefit of U.S. Provisional Patent Application No. 63/408,038, filed Sep. 19, 2022, which is hereby incorporated by reference herein in its entirety.

BACKGROUND

This relates generally to electronic devices with displays and, more particularly, to display driver circuitry for displays such as organic light-emitting diode (OLED) displays.

Electronic devices often include displays. For example, cellular telephones and portable computers typically include displays for presenting image content to users. OLED displays have an array of display pixels based on light-emitting diodes. In this type of display, each display pixel includes a light-emitting diode and associated transistors for controlling application of data signals to the light-emitting diode to produce light. It can be challenging to design display pixels.

SUMMARY

An electronic device may include a display having an array of display pixels. Each display pixel may include at least an organic light-emitting diode (OLED) that emits light and associated transistors for controlling the operation of that pixel. In accordance with an embodiment, a display pixel can include a light-emitting diode, up to three transistors, and up to two capacitors. The display pixel can include a drive transistor, an emission transistor, and a select transistor. The emission transistor, the drive transistor, and the diode can be coupled in series between first and second power supply lines. A storage capacitor can be coupled across the gate and source nodes of the drive transistor. An additional capacitor can be coupled to the anode of the diode. The select transistor can be configured to apply a reference voltage or a data voltage to the gate node of the drive transistor.

The display pixel can be operable in a global reset phase, a global compensation phase, a data programming phase, and an emission phase to support in-pixel threshold voltage cancellation. During the global reset phase, the first power supply line is pulled low to a reset voltage, and the emission transistor can be used to pass the reset voltage through the drive transistor to reset the diode. During the global reset phase, the select transistor in all of the display pixels are simultaneously asserted to apply the reference voltage to the gate node of each drive transistor. During the global compensation phase, the first power supply line is pulled up to a positive power supply voltage, thus sampling each drive transistor's threshold voltage on the respective storage capacitor. During the data programming phase, the select transistors of the different rows can be sequentially activated to load desired data signals into each pixel. During the emission phase, the emission transistors can be activated so that the corresponding diodes can emit an amount of light that is a function of the data signals programmed into the pixels.

If desired, the emission transistor can be omitted from each pixel. In certain embodiments, a row of pixels can be coupled to a single shared (common) emission transistor. The emission transistor may be coupled to a voltage line that can be toggled between high and low voltages using a power management circuit or that can be selectively coupled to a high voltage line or a low voltage line.

DETAILED DESCRIPTION

Figure 1:
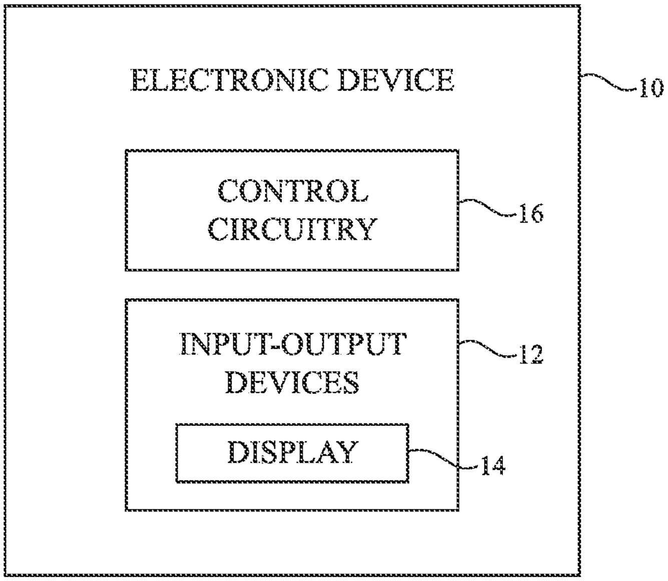
FIG. 1 is a diagram of an illustrative electronic device having a display in accordance with some embodiments.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, application processors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14. Device 10 may be a tablet computer, laptop computer, a desktop computer, a display, a cellular telephone, a media player, a wristwatch device or other wearable electronic equipment, a head-mounted device, eyewear, or other suitable electronic device.

Display 14 may be an organic light-emitting diode display or may be a display based on other types of display technology. Configurations in which display 14 is an organic light-emitting diode (OLED) display are sometimes described herein as an example. This is, however, merely illustrative. Any suitable type of display may be used in device 10, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
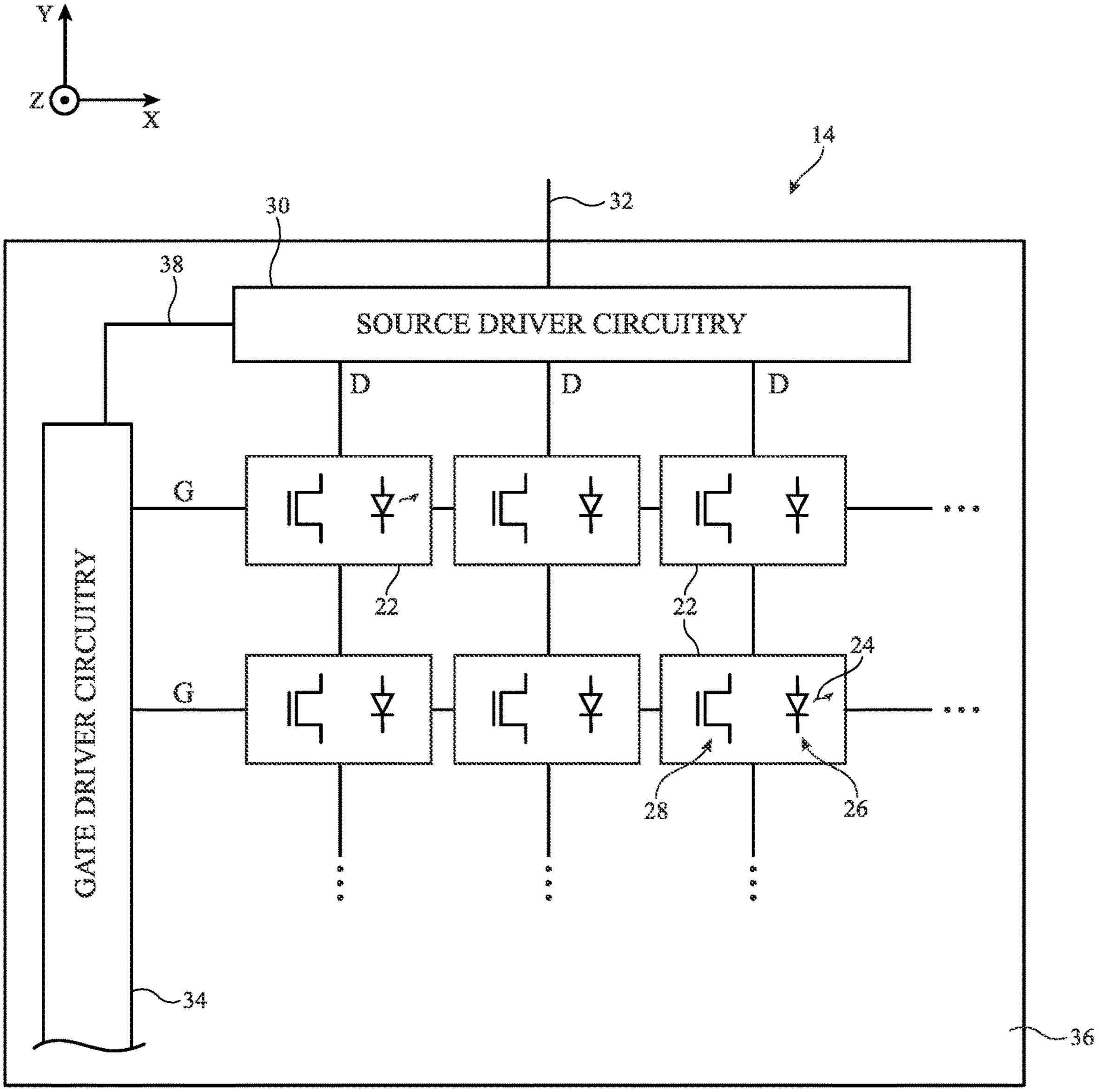
FIG. 2 is a diagram of an illustrative display having an array of organic light-emitting diode display pixels in accordance with some embodiments.

A top view of a portion of display 14 is shown in FIG. 2. As shown in FIG. 2, display 14 may have an array of pixels 22 formed on a substrate 36. Substrate 36 may be formed from glass, metal, plastic, ceramic, porcelain, silicon, or other substrate materials. Pixels 22 may receive data signals over signal paths such as data lines D (sometimes referred to as data signal lines, column lines, etc.) and may receive one or more control signals over control signal paths such as horizontal control lines G (sometimes referred to as gate lines, scan lines, emission lines, row lines, etc.). There may be any suitable number of rows and columns of pixels 22 in display 14 (e.g., tens or more, hundreds or more, or thousands or more).

Each pixel 22 may have a light-emitting diode 26 that emits light 24 under the control of a pixel control circuit formed from thin-film transistor circuitry or bulk silicon transistor circuitry (e.g., transistors 28 and capacitors). Thin-film transistors 28 may be polysilicon thin-film transistors, semiconducting oxide thin-film transistors such as indium zinc gallium oxide transistors, or thin-film transistors formed from other semiconductors. Pixels 22 may contain light-emitting diodes of different colors (e.g., red, green, and blue) to provide display 14 with the ability to display color images.

Source driver circuitry 30 may be used to control the operation of pixels 22. The source driver circuitry 30 may be formed from integrated circuits, thin-film transistor circuits, or other suitable electronic circuitry. Source driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, source driver circuitry 30 may supply image data to data lines D (e.g., data lines that run down the columns of pixels 22) while issuing clock signals and other control signals to supporting display driver circuitry such as gate driver circuitry 34 over path 38. If desired, source driver circuitry 30 may also supply clock signals and other control signals to gate driver circuitry 34 on an opposing edge of display 14 (e.g., the gate driver circuitry may be formed on more than one side of the display pixel array).

Gate driver circuitry 34 (sometimes referred to as horizontal line control circuitry or row driver circuitry) may be implemented as part of an integrated circuit and/or may be implemented using thin-film transistor circuitry. Horizontal/row control lines G in display 14 may carry gate line signals (scan line control signals), emission enable control signals, and/or other horizontal control signals for controlling the pixels of each row. The row control lines G are therefore sometimes referred to as gate lines. There may be any suitable number of horizontal control signals per row of pixels 22 (e.g., one or more row control lines, two or more row control lines, three or more row control lines, four or more row control lines, five or more row control lines, etc.).

Certain applications require displays with high contrast ratio and high resolution. Displays such as organic light-emitting diode (OLED) displays can provide high resolution and high contrast ratio. Display pixels in an OLED display can include thin-film transistors that are subject to threshold voltage variation. Variations in transistor threshold voltages can result in non-uniformity in pixel-to-pixel luminance across an array of display pixels. To provide a high contrast ratio while ensuring sufficient pixel-to-pixel luminance uniformity, in-pixel (internal) threshold voltage compensation techniques can be employed. Conventional pixel architectures that support internal threshold voltage compensation, however, include a large number of thin-film transistors, which limits the maximum achievable resolution of the display. For instance, a conventional OLED pixel that supports in-pixel threshold voltage compensation typically includes seven or more transistors coupled to a light-emitting diode.

Figure 3:
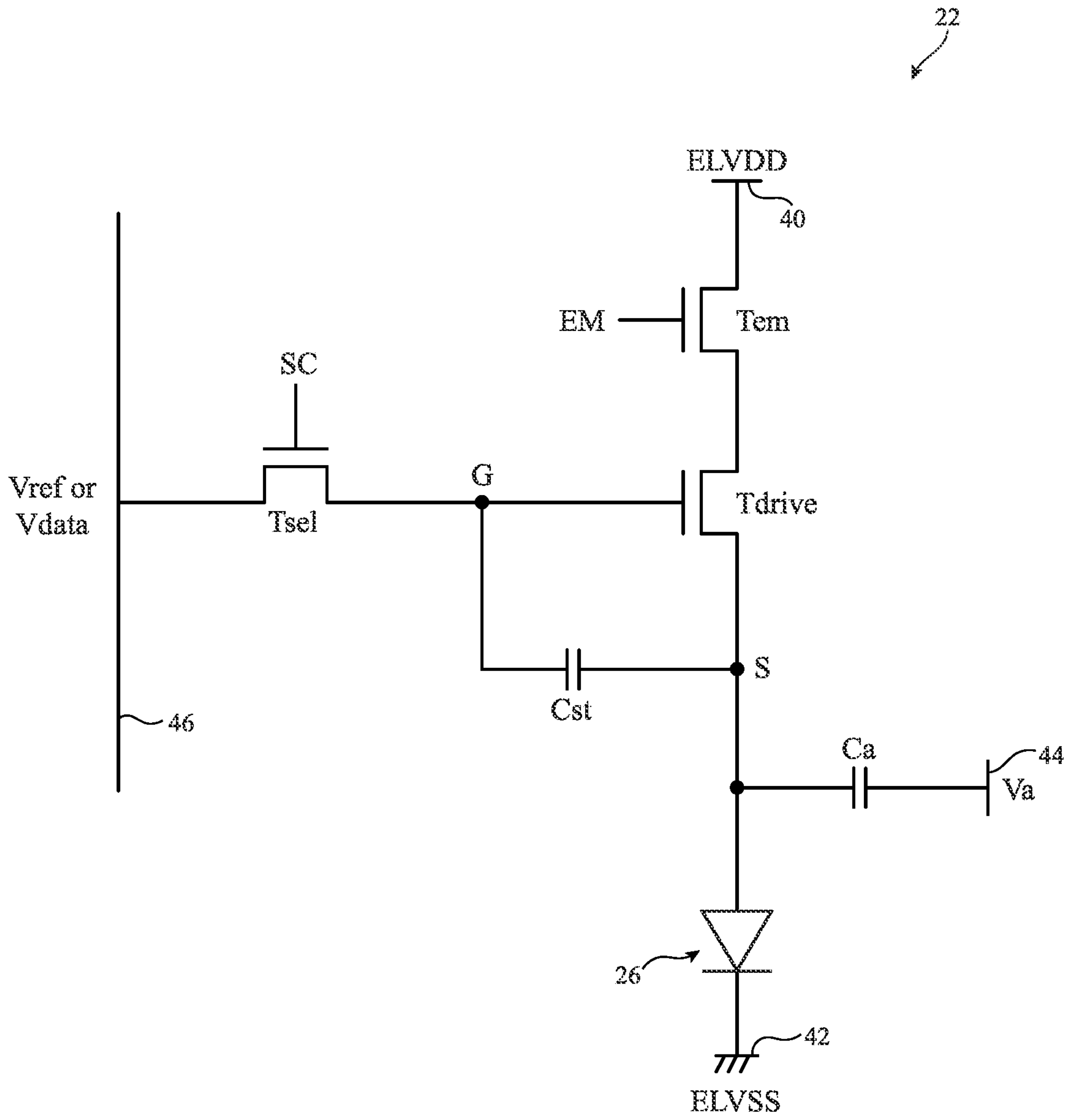
FIG. 3 is a circuit diagram of an illustrative organic light-emitting diode display pixel in accordance with some embodiments.

In accordance with an embodiment, FIG. 3 is a circuit diagram of an illustrative organic light-emitting diode (OLED) display pixel 22 with a reduced transistor count while still being able to support in-pixel (internal) threshold voltage compensation. As shown in FIG. 3, display pixel 22 includes only three thin-film transistors such as transistors Tdrive, Tem, and Tsel, two capacitors such as capacitors Cst and Ca, and an organic light-emitting diode 26. Transistors Tdrive, Tem, and Tsel can be n-type semiconducting oxide transistors. Semiconducting oxide transistors are defined as thin-film transistors having a channel region formed from semiconducting oxide material (e.g., indium gallium zinc oxide or IGZO, indium tin zinc oxide or ITZO, indium gallium tin zinc oxide or IGTZO, indium tin oxide or ITO, or other semiconducting oxide material).

A semiconducting oxide transistor is notably different than a silicon transistor (i.e., a transistor having a polysilicon channel region deposited using a low temperature process sometimes referred to as LTPS or low-temperature polysilicon). Semiconducting oxide transistors exhibit relatively lower leakage than silicon transistors, so implementing at least some of the transistors within pixel 22 can help reduce flicker and luminance non-uniformity (e.g., by preventing current from leaking away from the gate terminal of transistor Tdrive). If desired, at least some of the transistors within pixel 22 may be implemented as silicon transistors such that pixel 22 has a hybrid configuration that includes a combination of semiconducting oxide transistors and silicon transistors (e.g., n-type LTPS transistors or p-type LTPS transistors). Configurations in which all of the transistors within display pixel 22 are semiconducting oxide transistors are sometimes described herein as an example.

Transistor Tdrive (sometimes referred to herein as a "drive transistor") may have a drain terminal, a gate terminal coupled to node G, and a source terminal coupled to node S. The terms "source" and "drain" are sometimes used interchangeably when referring to current-conducting terminals of a thin-film transistor. The source and drain terminals are therefore sometimes referred to as "source-drain" terminals (e.g., a transistor has a gate terminal, a first source-drain terminal, and a second source-drain terminal). For instance, the drain terminal of transistor Tdrive can be referred to as a first source-drain terminal, and the source terminal of transistor Tdrive can be referred to as a second source-drain terminal, or vice versa. Capacitor Cst (sometimes referred to as a storage capacitor) may be coupled across the gate and source terminals of transistor Tdrive and may be configured to store a data value for display pixel 22.

Transistor Tem (sometimes referred to as an emission transistor) may have a source terminal coupled to the drain terminal of transistor Tdrive, a drain terminal coupled to a positive power supply line 40 (e.g., a positive power supply line on which positive supply voltage ELVDD is provided), and a gate terminal configured to receive an emission (control) signal EM. Pixel positive power supply voltage ELVDD may be 3 V, 4 V, 5 V, 6 V, 7 V, 2 to 8 V, greater than 6 V, greater than 7 V, greater than 8 V, greater than 10 V, greater than 12 V, 6-12 V, 12-20 V, or any suitable positive power supply voltage level. Display pixel 22 has only one emission transistor.

Organic light-emitting diode 26 may have an anode terminal coupled to the source terminal of drive transistor Tdrive and a cathode terminal coupled to a ground power supply line 42 (e.g., a ground line on which ground power supply voltage ELVSS is provided). Ground power supply voltage ELVSS may be 0 V, −1 V, −2 V, −3 V, −4 V, −5 V, −6V, −7 V, −8 V, −9 V, less than 2 V, less than 1 V, less than 0 V, less than −5 V, or any suitable ground or negative power supply voltage level. Connected in this way, transistors Tem and Tdrive are said to be connected in series with diode 26.

Diode 26 may have an associated parasitic capacitance, which can vary from pixel-to-pixel and change over its lifetime. The size of the diode parasitic capacitance, relative to the storage capacitance Cst, can affect the amount of applied data voltage appearing across transistor Tdrive and can thus affect the amount of drive current flowing through the drive transistor into diode 26, which directly impacts the luminance of each pixel 22. To help mitigate the effects of variance of the diode parasitic capacitance across the pixel array, each display pixel 22 can be provided with capacitor Ca coupled between the anode terminal of diode 26 and voltage line 44. Capacitor Ca may be sized larger than the diode parasitic capacitance. Voltage line 44 may be configured to receive a ground voltage, a negative voltage, a positive voltage, a voltage that is equal to ELVSS, a voltage that is different than ELVSS, or other static (direct current) reference voltage. Connected in this way, capacitor Ca can help mitigate the variation in the diode parasitic capacitance, which can help enhance pixel-to-pixel luminance uniformity. Capacitor Ca can also be referred to as a secondary storage capacitor while capacitor Cst serves as the primary storage capacitor. Capacitor Ca can also help extend the data range by capacitively coupling with Cst. Connected in this way, only part of the applied Vdata appears across the gate and source nodes of the drive transistor. A larger data range helps to relieve some burden on source driver circuitry 30 by increasing the gray level step size. The use of capacitor Ca in pixel 22 is optional. In the pixel 22 of FIG. 3, no additional transistors are coupled at the source terminal of Tdrive or at the anode terminal of diode 26.

Transistor Tsel (sometimes referred to herein as a select transistor, a gate voltage setting transistor, or a pass transistor) may have a first source-drain terminal coupled to the gate terminal of transistor Tdrive, a second source-drain terminal coupled to a control voltage line 46, and a gate terminal configured to receive a scan (control) signal SC. Transistor Tsel may serve as a dual purpose switch. During an initialization phase (e.g., during a reset phase and during a compensation phase), transistor Tsel may be used to apply a reference voltage Vref provided on control (adjustable) voltage line 46 to the drive transistor. During a programming phase (e.g., during a data loading phase), transistor Tsel may be used to apply a data voltage Vdata provided on voltage line 46 to the drive transistor. Voltage line 46 can therefore sometimes be referred to as a reference line, a data line, or a dual purpose reference-data line. The dual function of transistor Tsel combined with the ability to toggle ELVDD enables in-pixel threshold voltage compensation without requiring additional transistors. In the example of FIG. 3, pixel 22 includes only one transistor Tsel coupled at the gate terminal of transistor Tdrive.

Figure 4:
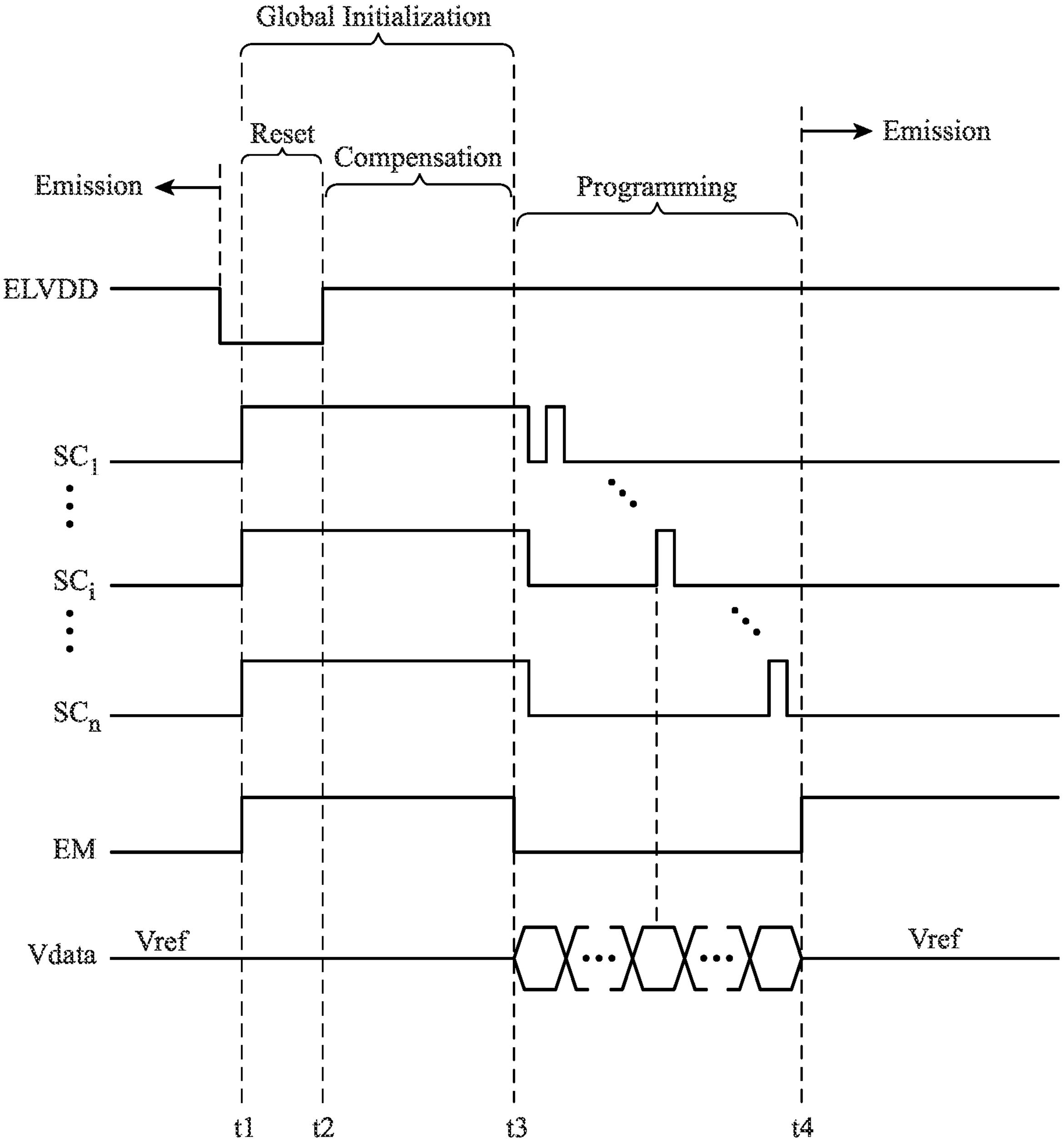
FIG. 4 is a timing diagram showing illustrative waveforms involved in operating the display pixel of FIG. 3 in accordance with some embodiments.

FIG. 4 is a timing diagram showing illustrative waveforms involved in operating the display pixel 22 of the type described in connection with FIG. 3. Prior to time t1, voltage ELVDD is asserted (e.g., driven high) during an emission phase while all the scan signals are low. Voltage ELVDD can then be pulsed low (e.g., supply line 40 can be toggled from a positive power supply voltage level to a low or reset voltage level).

At time t1, the scan signals for all of the rows in the pixel array can be simultaneously asserted. For example, while voltage ELVDD is driven low, scan signal $SC_1$ corresponding to a first row of pixels in the array can be asserted at time t1, . . . , scan signal $SC_i$ corresponding to an $i^{th}$ row of pixels in the array can be asserted at time t1, . . . , and scan signal $SC_n$ corresponding to an $n^{th}$ (last) row of pixels in the array can be asserted at time t1. Emission signal is also high during this time. Voltage ELVDD will be pulsed low until time t2 (e.g., ELVDD is driven back high at time t2). The time period from time t1 to t2 is sometimes referred to as a reset phase. Since the scan signals for all of the rows in the pixel array are asserted at the same time, all of the pixels in the array will be reset simultaneously, so the reset phase is sometimes referred to and defined as a "global" reset operation.

Figure 5A:
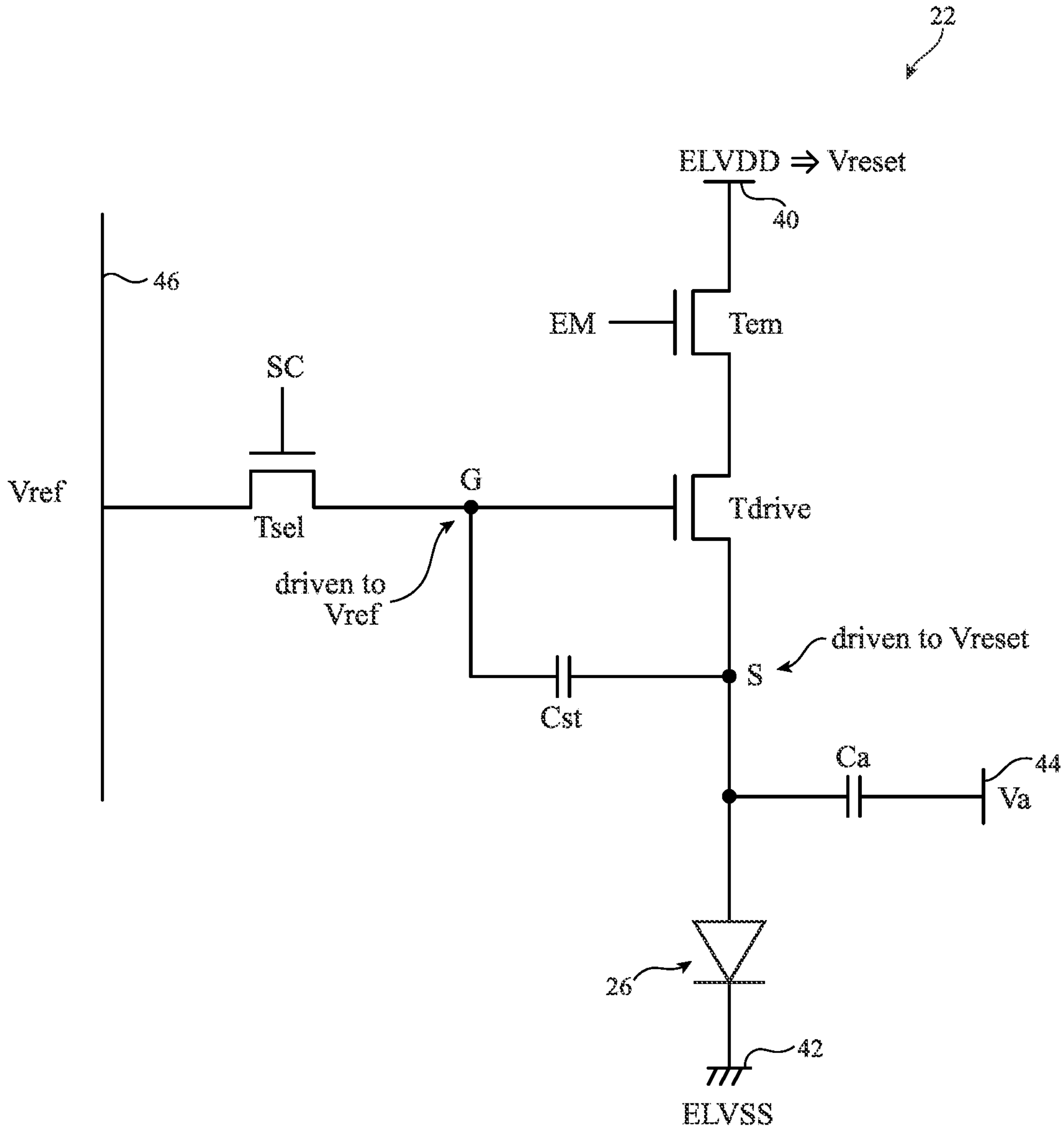
FIG. 5A is a diagram showing a snapshot of the display pixel of FIG. 3 during a reset phase in accordance with some embodiments.

FIG. 5A shows a snapshot of display pixel 22 of FIG. 3 during the global reset phase. As shown in FIG. 5A, voltage line 46 will be driven to a reference voltage Vref, and voltage ELVDD will be driven to a low voltage such as a reset voltage Vreset. Reference voltage Vref may be greater than ELVSS, greater than Vreset, 0 V, −1 V, −2 V, −3 V, −4 V, −5 V, −6V, −7 V, −8 V, −9 V, less than 2 V, less than 1 V, less than 0 V, less than −4 V, or any suitable initialization or negative power supply voltage level. Voltages Vref, Vreset, and ELVSS should be carefully selected such that diode 26 is not turned on during the global reset phase and during the compensation phase to maximize the contrast of display 14. Reset voltage Vreset may be equal to ELVSS, different than ELVSS, less than Vref, 0 V, −1 V, −2 V, −3 V, −4 V, −5 V, −6V, −7 V, −8 V, −9 V, less than 2 V, less than 1 V, less than 0 V, less than −5 V, or any suitable reset or negative power supply voltage level. Since all the scan signals are asserted during the reset phase, transistor Tsel will be turned on to drive the gate terminal of transistor Tdrive to reference voltage Vref. Since the emission signal is asserted during the reset phase, emission transistor Tem will also be turned on to drive the source node of transistor Tdrive and the anode terminal to voltage Vreset. By pulling ELVDD down to a reset voltage level Vreset, transistor Tem can be used to reset the anode terminal of diode 26 without using a separate dedicated anode reset transistor, which helps to further reduce pixel circuit area. Transistor Tem can therefore sometimes also be referred to as an anode reset transistor.

At time t2, ELVDD is driven back up to the positive power supply voltage level while all of the scan signals and the emission signal remains high. Emission signal can be deasserted at time t3. After time t3, the scan signals can all be simultaneously deasserted (e.g., driven low). The time period from time t2 to t3 is sometimes referred to as a compensation phase. Since the scan signals for all of the rows in the pixel array remain asserted during this time, all of the pixels in the array will be sampled simultaneously, so the compensation phase is sometimes referred to and defined as a "global" compensation operation.

Figure 5B:
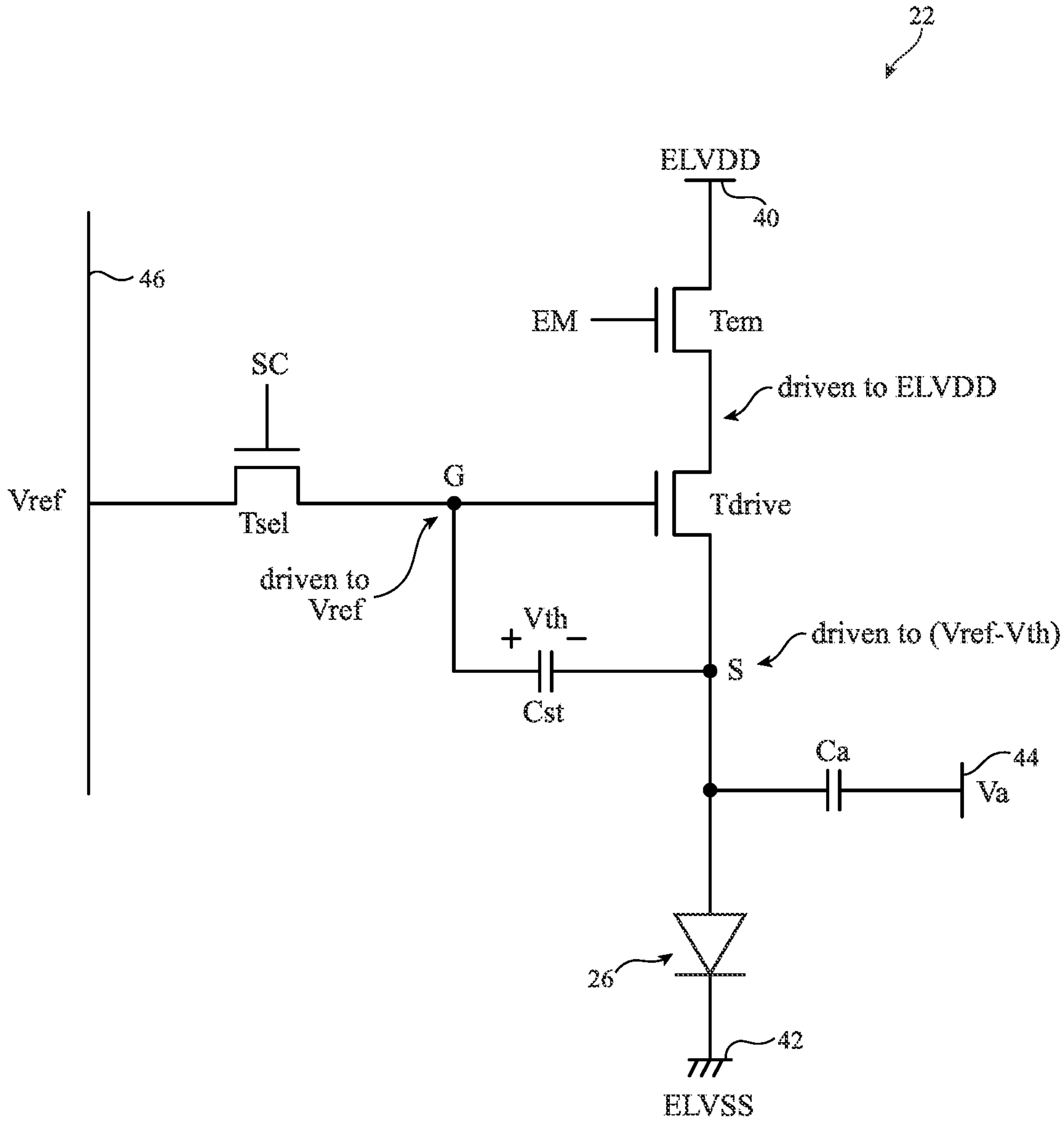
FIG. 5B is a diagram showing a snapshot of the display pixel of FIG. 3 during a compensation phase in accordance with some embodiments.

FIG. 5B shows a snapshot of display pixel 22 during the global compensation phase. As shown in FIG. 5B, voltage line 46 remains driven to reference voltage Vref, but voltage ELVDD will be driven back to a high (positive) power supply voltage level. Since all the scan signals remain high during the compensation phase, transistor Tsel will remain turned on to drive the gate terminal of transistor Tdrive to reference voltage Vref. Since the emission signal remains asserted during the compensation phase, emission transistor Tem will also be turned on to drive the drain node of transistor Tdrive to positive power supply voltage ELVDD. As a result, transistor Tdrive can pull its source node all the way up to one threshold voltage Vth below its gate terminal until Tdrive is turned off (e.g., the source terminal of Tdrive can be driven to Vref minus Vth, where Vth represents the threshold voltage of the drive transistor). Thus, threshold voltage Vth will be sampled across storage capacitor Cst. The drive transistor's threshold voltage Vth can be a positive value or a negative value.

Since the drive transistor's threshold voltage Vth of each pixel is sampled across that pixel's capacitor Cst, the compensation phase is sometimes referred to as the threshold voltage sampling phase or the threshold voltage compensation phase. Reference voltage Vref and ELVSS should be selected such that (Vref−Vth−ELVSS) does not turn on diode 26 during the global compensation phase to maximize the contrast of display 14. The reset phase and the compensation (threshold voltage sampling) phase can collectively be referred to and defined as a global initialization phase, which lasts from time t1 to t3.

Figure 5C:
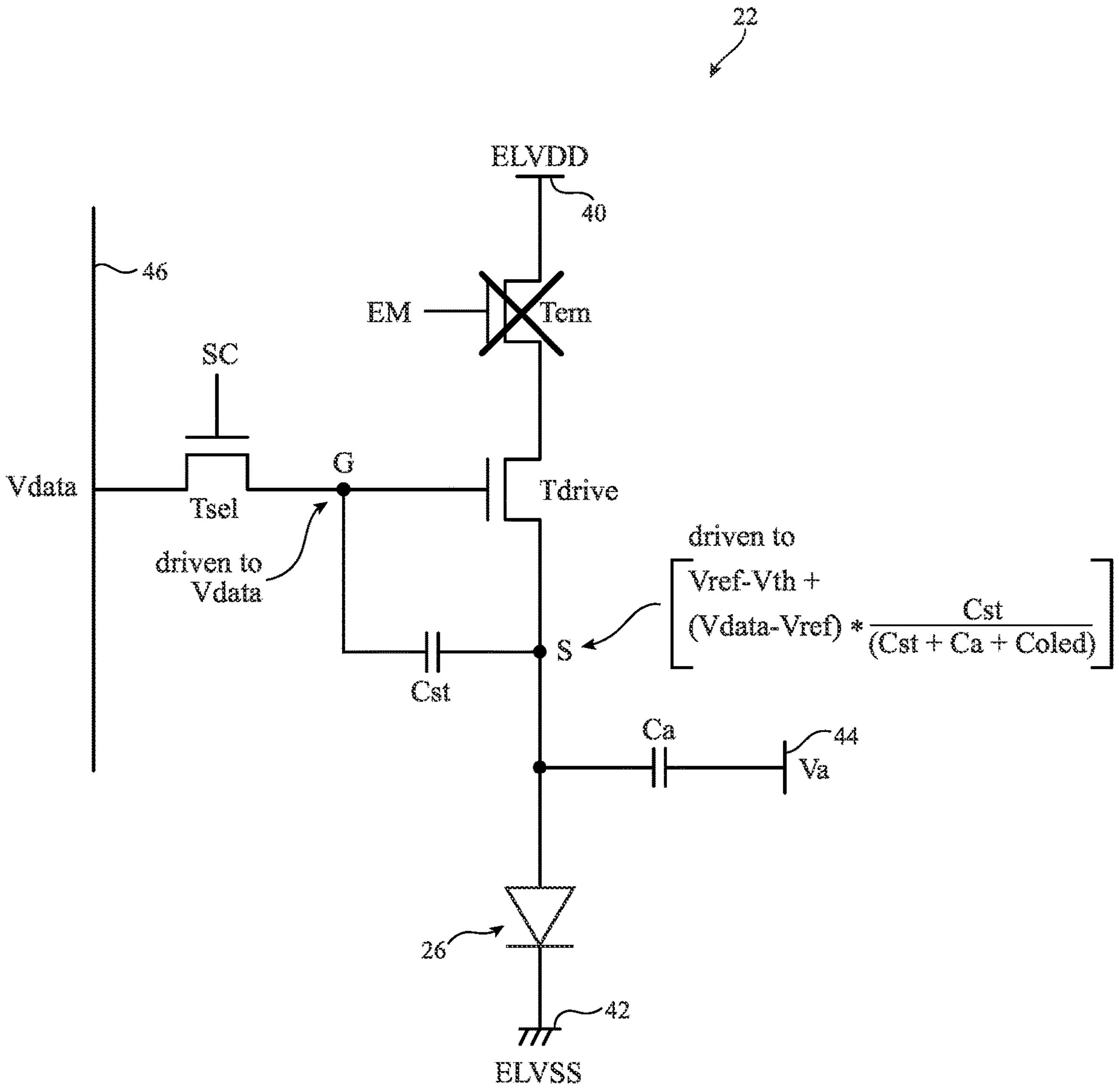
FIG. 5C is a diagram showing a snapshot of the display pixel of FIG. 3 during a programming phase in accordance with some embodiments.

At time t3, emission signal is driven low and shortly after, all of the scan signals are deasserted (e.g., driven low). The time period from time t3 to t4 is sometimes referred to as a programming phase, a data programming phase, or a data loading phase. During the data programming phase, the scan signal of each row may be sequentially pulsed high to load in a desired data signal. In the example of FIG. 4, scan signal $SC_i$ may be pulsed high to load in a corresponding data signal $Vdata_i$. FIG. 5C shows a snapshot of display pixel 22 during the programming phase. As shown in FIG. 5C, a data signal voltage Vdata is provided on line 46 and when scan signal SC is pulsed high during the programming phase, the gate terminal of transistor Tdrive will be driven to Vdata. Since emission signal EM is driven low, transistor Tem will be turned off. As a result, the voltage across capacitor Cst has nowhere to discharge. Since the threshold voltage Vth was previously sampled across capacitor Cst, the source node of transistor Tdrive will be driven to [Vref−Vth+(Vdata−Vref)*Cst/(Cst+Ca+Coled)] sometime before the end of the programming phase. Capacitance Coled may represent the parasitic capacitance of diode 26 in each display pixel. The pixels of each row in the array can be loaded in this way.

Figure 5D:
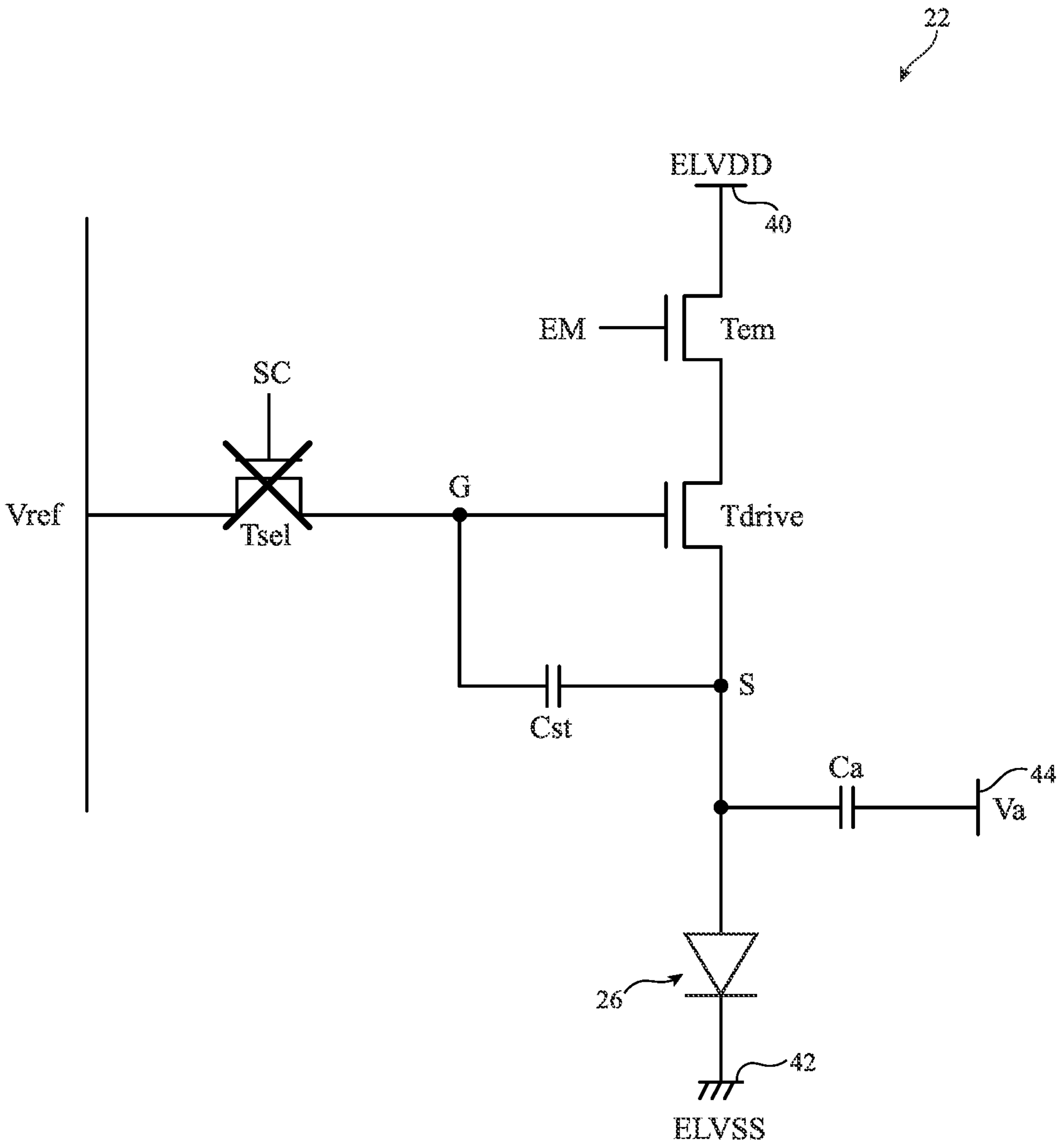
FIG. 5D is a diagram showing a snapshot of the display pixel of FIG. 3 during an emission phase in accordance with some embodiments.

At time t4, emission signal EM is asserted to start the emission phase. FIG. 5D shows a snapshot of display pixel 22 during the emission phase. As shown in FIG. 5D, transistor Tsel is turned off, so the programmed voltage held across the storage capacitor Cst, which is a combination of the sampled Vth and part of Vdata, has nowhere to discharge. Transistor Tsel should be a low leakage switch such as a semiconducting oxide transistor or other types of thin-film transistor that exhibit lower leakage than conventional silicon transistors so that the charge stored on capacitor Cst is retained after programming throughout the emission phase. Transistor Tsel may also be a silicon transistor tailored to possess low leakage such as one fabricated in fully depleted silicon on insulator (FD-SOI) technology. Since transistor Tem is turned on during the emission phase, transistor Tem will pull up the drain node of transistor Tdrive, and current will flow through transistors Tem and Tdrive down into organic light-emitting diode 26. The ELVDD and ELVSS voltages should be selected such that diode 26 has adequate voltage headroom throughout the operation lifetime of display 14. The amount of current flowing into diode 26 during the emission phase determines the amount of light that is emitted from diode 26. Since the amount of final emission current will be proportional to $(Vgs-Vth)^2$, the final emission current will only be a function of Vdata while the Vth terms cancel out. Thus, the resulting emission current will be independent of Vth. This type of operating scheme where the drive transistor threshold voltage is internally sampled and canceled out in this way is sometimes referred to as in-pixel threshold voltage compensation or cancellation.

Figure 6:
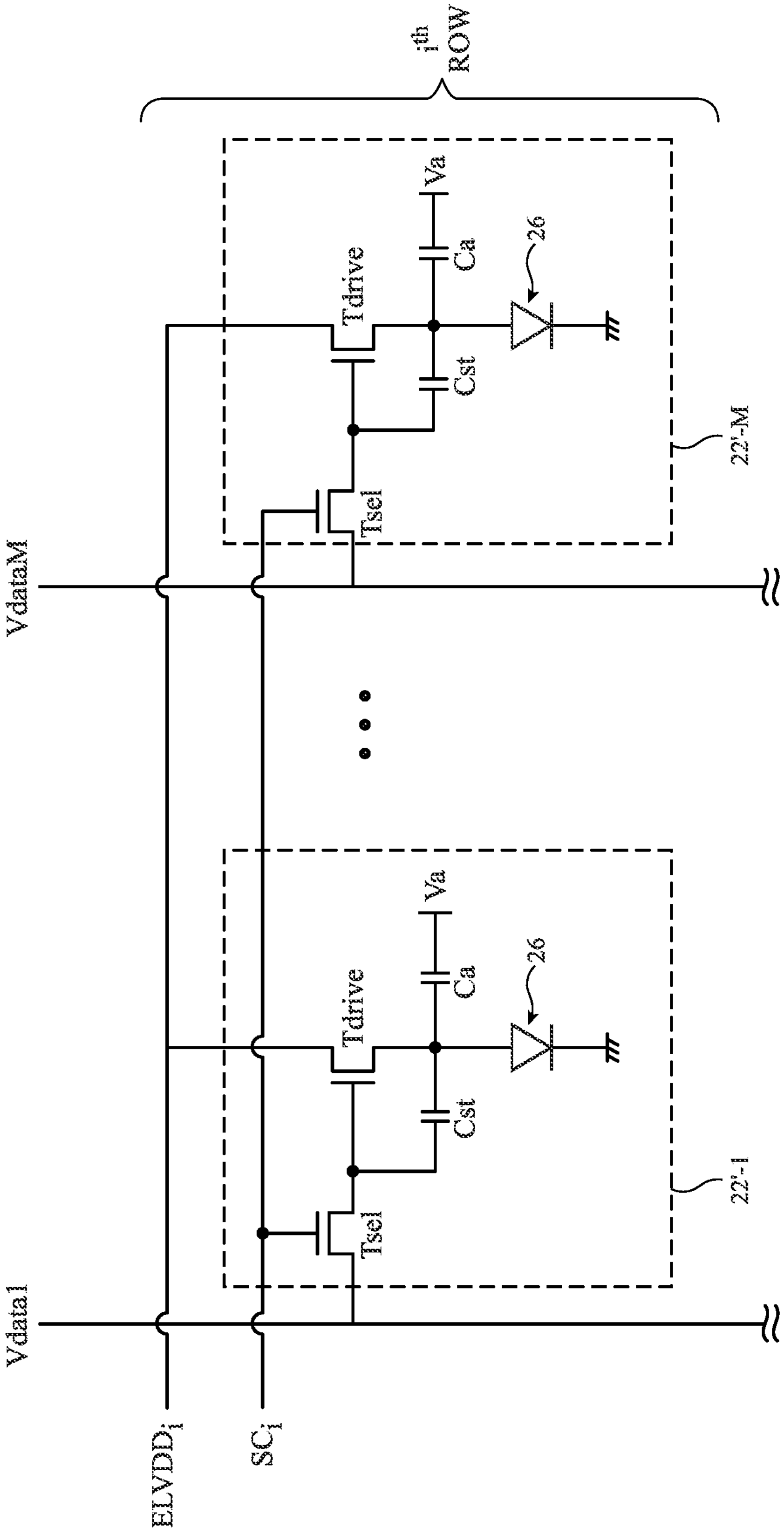
FIG. 6 is a diagram showing a row of displays pixels devoid of any dedicated emission transistors in accordance with some embodiments.

The embodiment of FIG. 3 in which display pixel 22 includes at least one emission transistor Tem is merely illustrative and is not intended to limit the scope of the present embodiments. FIG. 6 shows another suitable arrangement in which each display pixel 22' does not include any emission transistors. FIG. 6 shows an $i^{th}$ pixel row in a pixel array having a first display pixel 22'-1 in the first column, . . . , and an $M^{th}$ display pixel 22'-M in the $M^{th}$ (last) column. Pixel 22'-1 can receive a first data signal Vdata1 (or reference voltage Vref), whereas pixel 22'-M can receive an $M^{th}$ data signal VdataM (or reference voltage Vref). Each display pixel 22' is similar to pixel 22 of FIG. 3 but without emission transistor Tem. Thus, each display pixel 22' of FIG. 6 includes only two transistors Tdrive and Tsel, two capacitors Cst and Ca, and light-emitting diode 26. Each pixel 22' may receive a row-wise scan signal $SC_i$ and also a row-wise power supply voltage $ELVDD_i$. In other words, signals $SC_i$ and $ELVDD_i$ are row-wise control signals provided to pixels 22' in the $i^{th}$ row via row control lines that extend across a width of the array. Use of a row-wise $ELVDD_i$ is a departure from conventional pixel powering schemes were ELVDD is a global power supply voltage that is supplied to every display pixel in an array via a global power mesh. The use of capacitor Ca is optional.

Figure 7:
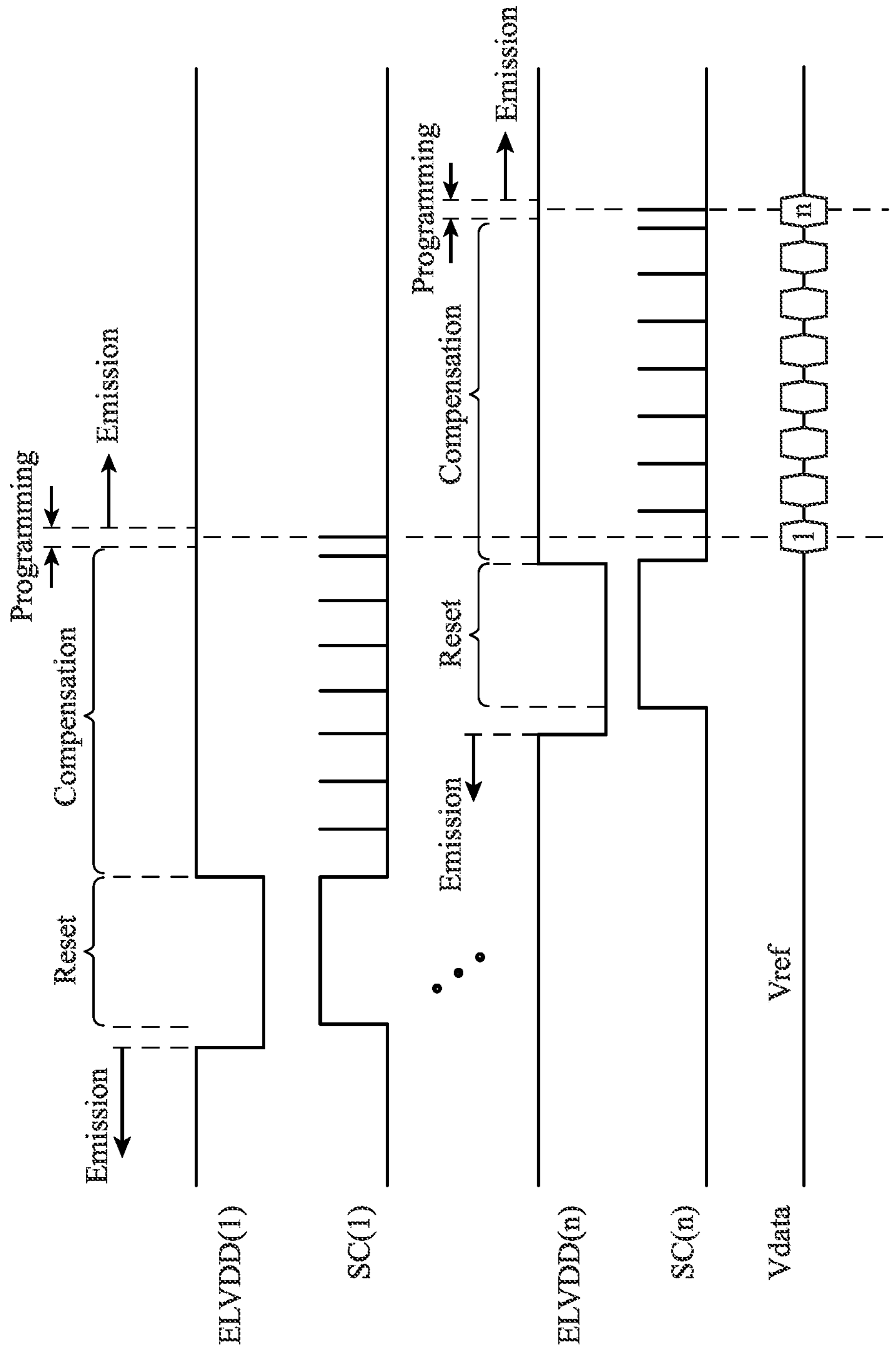
FIG. 7 is a timing diagram showing illustrative waveforms involved in operating rows of display pixels of the type shown in FIG. 6 in accordance with some embodiments.

FIG. 7 is a timing diagram showing illustrative waveforms involved in operating the row of display pixels 22' shown in FIG. 6. Without an emission transistor in each pixel 22', diode 26 will start emitting light right after the data programming phase, so there needs to be a way for pixel 22' to tune the emission duty cycle. As shown in FIG. 7, the various phases for each pixel row occurs in a rolling (time-shifted fashion). For each row, the emission phase is followed by the reset phase. During the reset phase, the row-wise ELVDD is pulsed low while the scan signal is pulsed high. Subsequently, the compensation phase can be performed by driving ELVDD back high while repeatedly pulsing the scan signal to apply reference voltage Vref to the gate terminal of the drive transistor. In other words, the compensation phase no longer occurs in a single stretch but rather occurs via a series of pulses between each data input. The cumulative duration of all of the pulses adds up to the effective duration of the compensation phase.

For each row, the data programming phase can occur after the compensation phase, during which the desired Vdata is loaded into the desired pixel 22'. For each row, the time period from the start of the compensation phase until when data has been programmed should be the same. Since the timing for each row is shifted from one row to another, it is possible for one row to be emitting while another row is resetting or performing threshold compensation/sampling. This driving scheme allows for the removal of the emission transistor while retaining emission duty cycle tunability through adjustment of the duration of the compensation phase and/or the reset phase (e.g., so that each row can have the same emission time).

Figure 8:
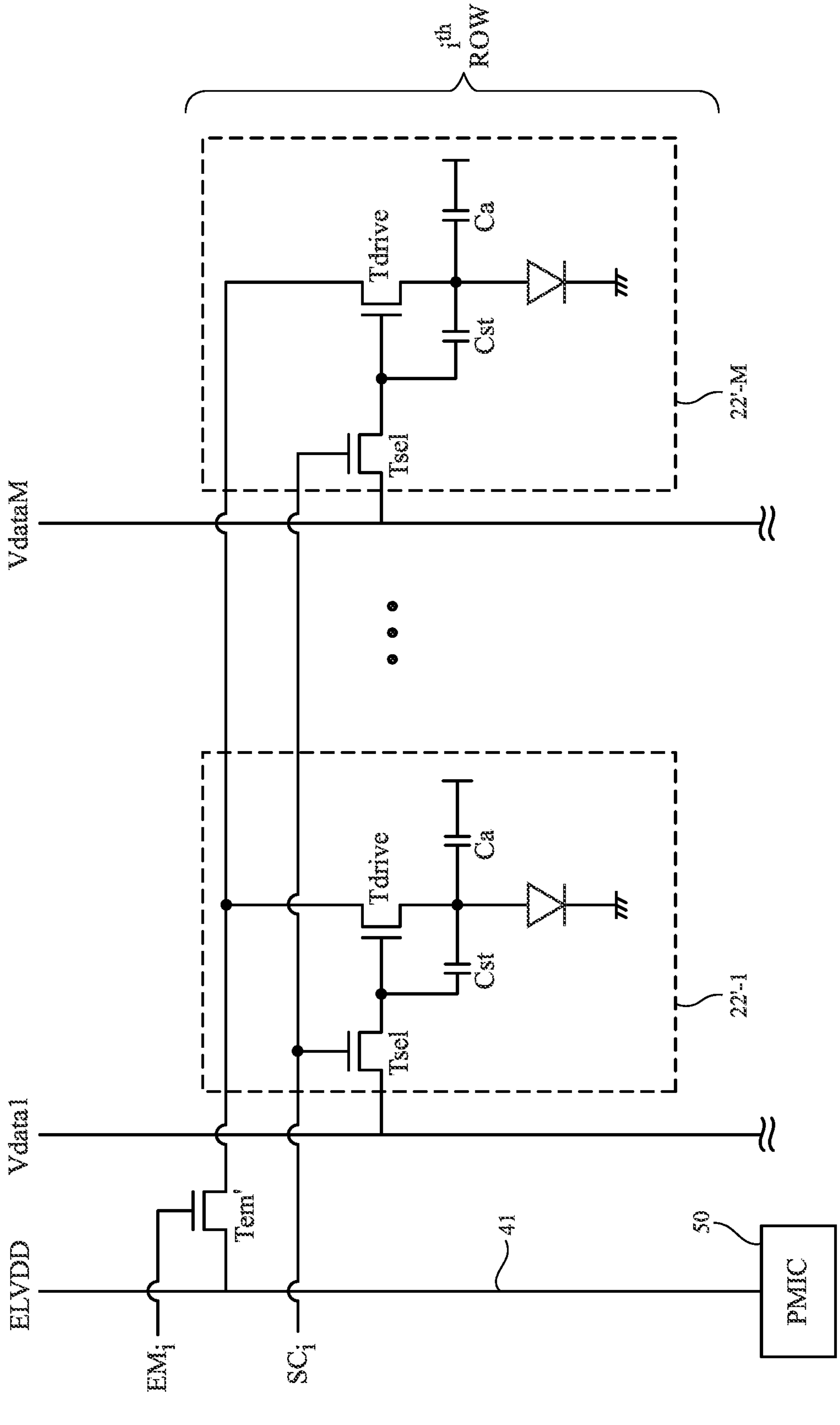
FIG. 8 is a diagram showing a row of display pixels coupled to a single row-wise emission switch that is coupled to a power management circuit in accordance with some embodiments.

FIG. 8 shows another embodiment where each row of pixels 22' is coupled to a shared (common) emission transistor Tem'. As shown in FIG. 8, each display pixel 22' does not include any emission transistors, but all of pixels 22' in the row is connected to one common emission transistor Tem'. FIG. 8 shows an $i^{th}$ pixel row in a pixel array having a first display pixel 22'-1 in the first column, . . . , and an $M^{th}$ display pixel 22'-M in the $M^{th}$ (last) column. Pixel 22'-1 can receive a first data signal Vdata1 (or reference voltage Vref), whereas pixel 22'-M can receive an $M^{th}$ data signal VdataM (or reference voltage Vref). Each display pixel 22' is similar to pixel 22 of FIG. 3 but without emission transistor Tem. Thus, each display pixel 22' of FIG. 8 includes only two transistors Tdrive and Tsel, two capacitors Cst and Ca, and light-emitting diode 26. The use of capacitor Ca is optional.

The drive transistor in each pixel 22' may have its drain node coupled to the shared emission transistor Tem' (e.g., there is only one total emission transistor for each row of pixels). The shared emission transistor Tem' may have a first source-drain terminal coupled to the drain node of the drive transistor of each display pixel 22' in a given row I, a second source-drain terminal coupled to voltage line 41, and a gate terminal configured to receive row-wise emission control signal $EM_i$. Voltage line 41 may be coupled to a power management circuit such as power management circuit 50. Power management circuit 50 may be configured to toggle the ELVDD voltage on line 41 between a positive power supply voltage and a reset voltage or other low voltage. Use of shared emission transistor Tem' to connect each row to supply voltage line 41 obviates the need for separate row-wise ELVDD lines as shown in the example of FIG. 6. The shared emission transistor Tem' should be sized large enough to drive an entire row of pixels 22'.

Figure 9:
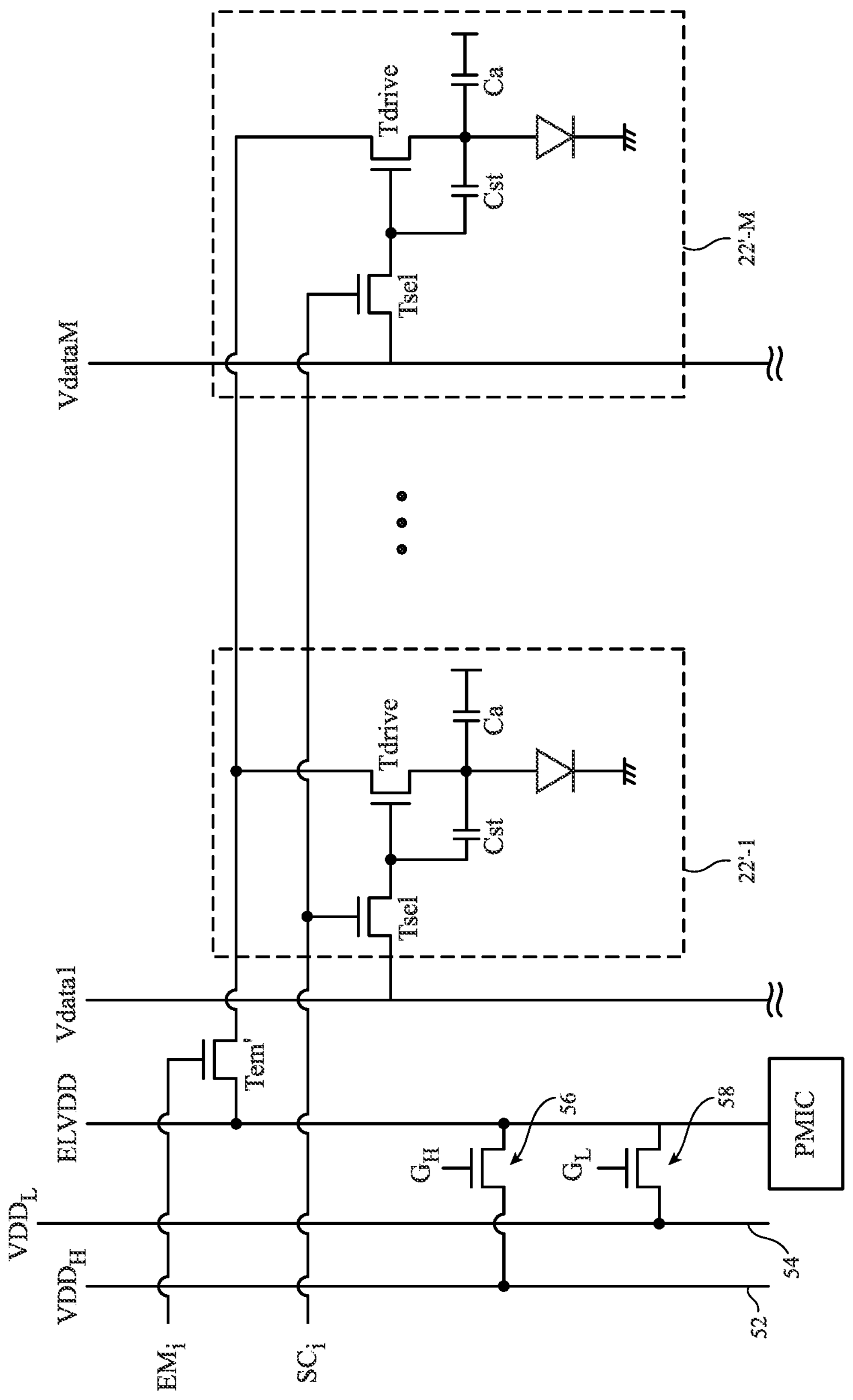
FIG. 9 is a diagram showing a row of display pixels coupled to a single row-wise emission switch that is selectively coupled to a high or low power supply voltage line in accordance with some embodiments.

The embodiment of FIG. 8 in which voltage line 41 is toggled using a power management circuit is illustrative. FIG. 9 shows another suitable arrangement in which voltage line 41 is selectively coupled to a high voltage line 52 (e.g., a power supply line on which high power supply voltage $VDD_H$ is provided) using switch 56 and is selectively coupled to a low voltage line 54 (e.g., a power supply line on which low power supply voltage $VDD_L$ is provided) using switch 58. Voltage $VDD_H$ may have a positive power supply voltage level, whereas voltage $VDD_L$ may have a reset voltage or other low level. Switches 56 and 58 can be implemented as n-type transistors (as an example).

Switch 56 can be turned on (e.g., by selectively asserting gate signal GO, whereas switch 58 can be turned on (e.g., by selectively asserting gate signal G L). Only one of switches 56 and 58 should be turned on at any given time. Switch 58 should be turned on only during the reset phase to supply low voltage $VDD_L$ to voltage line 41. During other phases of operation (e.g., during the emission phase, threshold voltage compensation phase, or the data programming phase), switch 56 should be turned on so that $VDD_H$ is supplied to voltage line 41. During the data programming phase, $VDD_L$ may alternatively be supplied to voltage line 41. Keeping voltage line 41 at $VDD_H$ before and after data programming, however, avoids unnecessary switching. Selectively coupling voltage line 41 to $VDD_H$ or $VDD_L$ obviates the need for a power management circuit for actively toggling ELVDD at the expense of two extra transistors and two additional voltage lines 52 and 54.

The foregoing is merely illustrative and various modifications can be made to the described embodiments. The foregoing embodiments may be implemented individually or in any combination.

What is claimed is:

1. A display pixel comprising:

a light-emitting diode having a cathode coupled to a first power supply line with a power supply voltage;

a drive transistor having a first source-drain terminal coupled to a second power supply line with a second power supply voltage, a second source-drain terminal coupled to the light-emitting diode, and a gate terminal;

a storage capacitor coupled between the gate terminal and the second source-drain terminal of the drive transistor;

an additional capacitor having a first terminal directly coupled to an anode of the light-emitting diode and having a second terminal coupled to a voltage line with a static voltage; and a select transistor having a first source-drain terminal coupled to the gate terminal of the drive transistor, a second source-drain terminal coupled to a control voltage line, and a gate terminal configured to receive a scan signal, wherein the select transistor is configured to apply a reference voltage to the gate terminal of the drive transistor during an entirety of a global reset phase and is configured to apply a data voltage to the gate terminal of the drive transistor during a programming phase, and wherein the second power supply voltage is driven low during the global reset phase and is driven high during the programming phase.

2. The display pixel of claim 1, further comprising:

an emission transistor having a first source-drain terminal coupled to the first source-drain terminal of the drive transistor, a second source-drain terminal coupled to the second power supply line, and a gate terminal configured to receive an emission signal.

3. The display pixel of claim 2 comprising a total of only three thin-film transistors, including the drive transistor, the select transistor, and the emission transistor, and one or more capacitors.

4. The display pixel of claim 2, wherein the select transistor and the emission transistor are turned on during the global reset phase.

5. The display pixel of claim 4, wherein the anode of the light-emitting diode is reset during the global reset phase.

6. The display pixel of claim 5, wherein the select transistor and the emission transistor are turned on during a global threshold voltage compensation phase subsequent to the global reset phase, and wherein the second power supply line is driven high during the global threshold voltage compensation phase.

7. The display pixel of claim 6, wherein:
- the select transistor is turned on during the programming phase to apply the data voltage to the gate terminal of the drive transistor; and
- the emission transistor is turned off during the programming phase.

8. The display pixel of claim 1, wherein the select transistor comprises a semiconducting oxide transistor having a channel region formed using semiconducting oxide or a silicon transistor fabricated using fully depleted silicon on insulator (FD-SOI) technology.

9. A method of operating a display having an array of pixels, the method comprising:
- during an emission phase, driving a power supply voltage high and driving an emission signal high so that the array of pixels emit light;
- during an entirety of a global reset phase, driving the power supply voltage low and simultaneously asserting scan signals for multiple rows of pixels in the array of pixels to apply a reference voltage to pixels in the multiple rows of pixels; and
- during a programming phase, sequentially asserting the scan signals to load data into respective rows in the array of pixels while driving the power supply voltage high.

10. The method of claim 9, further comprising:
- during a global threshold voltage sampling phase, driving the power supply voltage high while simultaneously supplying the reference voltage to the multiple rows of pixels in the array of pixels.

11. The method of claim 10, wherein the global threshold voltage sampling phase is subsequent to the global reset phase and prior to the programming phase.

12. The method of claim 10, wherein at least some pixels in the array of pixels comprise:
- a light-emitting diode;
- a drive transistor coupled in series with the light-emitting diode;
- a storage capacitor coupled across gate and source terminals of the drive transistor;
- an emission transistor coupled in series with the drive transistor, the emission transistor having a source-drain terminal being configured to receive the power supply voltage; and
- a gate voltage setting transistor coupled to the gate terminal of the drive transistor and configured to receive the reference voltage during the global reset phase and during the global threshold voltage sampling phase and to receive a data voltage during the programming phase.

13. The method of claim 12, wherein the at least some pixels in the array of pixels further comprise:
- an additional capacitor coupled between an anode of the light-emitting diode and a static voltage line.

14. Display circuitry comprising:
- a first pixel having a first light-emitting diode, a first drive transistor coupled in series with the first light-emitting diode, and a first pass transistor coupled at a gate terminal of the first drive transistor;
- a second pixel having a second light-emitting diode, a second drive transistor coupled in series with the second light-emitting diode, and a second pass transistor coupled at a gate terminal of the second drive transistor;
- a scan line coupled to the first pass transistor in the first pixel and the second pass transistor in the second pixel, wherein the first and second pixels each include only two transistors and one or more capacitors;
- a shared emission transistor having a first source-drain terminal coupled to drain terminals of the first and second drive transistors;
- a first switch having a first source-drain terminal coupled to a second source-drain terminal of the shared emission transistor and having a second source-drain terminal coupled to a first voltage line on which a first voltage is provided; and
- a second switch having a first source-drain terminal coupled to the second source-drain terminal of the shared emission transistor and having a second source-drain terminal coupled to a second voltage line on which a second voltage, different than the first voltage is provided, wherein at most one of the first and second switches is activated at any given point in time during operation of the display circuitry.

15. The display circuitry of claim 14, wherein the first pixel further includes a first capacitor coupled across the gate terminal and a source terminal of the first drive transistor.

16. The display circuitry of claim 15, wherein the first pixel further includes a second capacitor coupled between an anode of the first light-emitting diode and a static voltage line.

17. The display circuitry of claim 14, further comprising:
- a third pixel having a third light-emitting diode, a third drive transistor coupled in series with the third light-emitting diode, and a third pass transistor coupled at a gate terminal of the third drive transistor;
- a fourth pixel having a fourth light-emitting diode, a fourth drive transistor coupled in series with the fourth light-emitting diode, and a fourth pass transistor coupled at a gate terminal of the fourth drive transistor; and
- an additional scan line coupled to the third pass transistor in the third pixel and the fourth pass transistor in the fourth pixel, wherein the third and fourth pixels each include only two transistors and one or more capacitors, wherein a first scan signal on the scan line is pulsed to perform a first reset operation, and wherein a second scan signal on the additional scan line is pulsed to perform a second reset operation after the first reset operation.

18. The display circuitry of claim 14, wherein a scan signal on the scan line is pulsed during a reset phase, is pulsed during a data programming phase, and is pulsed a plurality of times during a compensation phase between the reset phase and the data programming phase.

19. The display circuitry of claim 14, wherein a duration of the compensation phase or a duration of the reset phase is adjusted to tune an emission duty cycle of the first and second pixels.

20. The display circuitry of claim 14, further comprising:

a power management circuit coupled to the second source-drain terminal of the shared emission transistor via a power supply line separate from the first and second voltage lines.

21. The display circuitry of claim 14, wherein the first switch has a gate terminal configured to receive a first gate signal and wherein the first switch has a gate terminal configured to receive a second gate signal different than the first gate signal.

* * * * *